United States Patent
Sano et al.

(10) Patent No.: US 8,827,656 B2
(45) Date of Patent: Sep. 9, 2014

(54) MOTOR CONTROL APPARATUS/METHOD FOR ELECTRIC OIL PUMP

(75) Inventors: Yukihiro Sano, Fuji (JP); Ippei Suzuki, Hitachinaka (JP); Yuukou Nojiri, Hitachi (JP); Jyunichi Noda, Naka (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 403 days.

(21) Appl. No.: 13/230,031

(22) Filed: Sep. 12, 2011

(65) Prior Publication Data
US 2012/0063922 A1 Mar. 15, 2012

(30) Foreign Application Priority Data
Sep. 14, 2010 (JP) .................................. 2010-205150

(51) Int. Cl.
| | | |
|---|---|---|
| F04B 49/06 | (2006.01) | |
| F16H 61/682 | (2006.01) | |
| F16H 61/02 | (2006.01) | |
| F16H 61/688 | (2006.01) | |
| F16H 61/12 | (2010.01) | |
| F16H 61/30 | (2006.01) | |

(52) U.S. Cl.
CPC .......... *F16H 61/0206* (2013.01); *F16H 61/682* (2013.01); *F16H 61/688* (2013.01); *F16H 61/12* (2013.01); *F16H 61/30* (2013.01)
USPC ............................................................ 417/45

(58) Field of Classification Search
USPC ................................ 417/44.1, 45, 44.2, 44.11
See application file for complete search history.

(56) References Cited

U.S. PATENT DOCUMENTS

2006/0120876 A1 6/2006 Kitano et al.
2009/0237015 A1 9/2009 Hashimoto et al.

FOREIGN PATENT DOCUMENTS

JP 11-287316 A 10/1999
JP 2006-161850 A 6/2006

*Primary Examiner* — Bryan Lettman
(74) *Attorney, Agent, or Firm* — Foley & Lardner LLP

(57) ABSTRACT

Motor control apparatus for an electric oil pump includes the control command generating section configured to drive the motor control section by the first current command signal obtained from the fixed second target torque signal of the second signal generating section in a first stage, when the control command generating section receives the start command of the motor from the host control device when engine stops, to output the sum signal of the first current command signal and the second current command signal to the current control section, and to drive the motor control section by the third current command signal in a second stage, and to switch the output of the target torque switching section from the fixed second target torque signal to the first target torque signal of the first signal generating section in a third stage.

6 Claims, 3 Drawing Sheets

MOTOR CONTROL APPARATUS/METHOD FOR ELECTRIC OIL PUMP

BACKGROUND OF THE INVENTION

This invention relates to a control apparatus/method for an electric oil pump, and more specifically to a control apparatus/method for an electric oil pump suitable when a brushless motor is used for driving the electric oil pump in an oil pump system.

A hybrid vehicle arranged to be driven by a gasoline engine and an electric motor has been developed in view of improvement in improving fuel economy of a vehicle and environment issues. The hybrid vehicle performs an idling stop control to stop the engine when the vehicle stops. Moreover, some gasoline vehicles perform the idling stop control.

The vehicle which performs the idling stop control includes an oil pump driven by an engine and an electric oil pump driven by a motor for ensuring a hydraulic pressure for an oil lubricating system for a transmission, and a hydraulic pressure for driving an actuator such as a clutch for driving a running motor.

During the idling stop, the electric oil pump arranged to be driven by the motor is started in place of the oil pump driven by the stopped engine so as to ensure the hydraulic pressure supply at the stop of the vehicle. With this, it is possible to smoothly perform the next start of the vehicle.

Japanese Patent Application Publication No. 2006-161850 discloses an oil supply apparatus for a vehicle which is arranged to perform the idling stop control, and in which a target torque of a motor for driving an electric oil pump is varied in accordance with states of the vehicle.

SUMMARY OF THE INVENTION

However, when the target torque of the motor for driving the oil pump is set as mentioned above, the operation of the hydraulic pressure becomes often unstable state by switching of the hydraulic passages and so on suddenly after start of driving of the oil pump. For example, when the hydraulic passage to a clutch is opened by opening a valve, the oil pump becomes a light load state until the hydraulic fluid is supplied to a supply destination. Conversely, when the oil pump is activated in a filled state of the hydraulic pressure, the oil pump becomes a larger overload state than expected.

Consequently, in a case in which the target torque is set out of consideration of the load state suddenly after the start of the driving of the oil pump, the rotational speed of the motor is suddenly increased in a no load state, and the rotational speed of the motor is suddenly decreased in the heavy load state. Therefore, the operation of the motor may become the unstable state.

In particular, an oil pump driving motor of a sensorless control type which does not have a magnetic pole position sensor and a rotation sensor, suffers from such a problem that the motor is diverted from a controllable region and brought into step-out (loss of synchronism) in which the motor is uncontrollable.

It is, therefore, an object of the present invention to provide a motor control apparatus/method for an electric oil pump to be devised to solve the above mentioned problem, and to perform stable control operation in a sensorless control.

According to one aspect of the present invention, a motor control apparatus for an electric oil pump in an oil pump system, the oil pump system including a mechanical oil pump arranged to be driven by an engine to supply a hydraulic pressure, an electric oil pump arranged to be driven by a sensorless motor to supply the hydraulic pressure, an oil supply switching mechanism arranged to select an oil supply from the mechanical oil pump when the engine drives, and to select the oil supply from the electric oil pump when the engine stops, and a host control device configured to generate a start signal of the motor and an information of the oil supply of the oil pump system when the engine stops, the motor control apparatus comprises: a control command generating section configured to generate a sum signal of a first current command signal to determine a torque of the motor and a second current command signal determined by a deviation in rotational speed of the motor, by using the information of the oil supply from the host control device; a current control section configured to generate a third current command signal from a difference between the sum signal outputted from the control command generating section and a load current flowing in the motor; a motor control section configured to receive the third current command signal from the current control section, and to perform a vector control; an electric power conversion section configured to be controlled by the motor control section, and to control an alternating current applied to the motor; the control command generating section including; a first signal generating section configured to generate a first target torque signal from the information of the oil supply from the host control device, a second signal generating section configured to generate a fixed second target torque signal, a target torque switching section configured to set one of the first target torque signal and the fixed second target torque signal from the first signal generating section and the second signal generating section, to the first current command signal, a third signal generating section configured to set an upper limit rotational speed of the motor from the information of the oil supply from the host control device, a forth signal generating section configured to set a lower limit rotational speed of the motor from the information of the oil supply from the host control device, a speed control section configured to sense the rotational speed of the motor, and to set the second current command signal to control the rotational speed of the motor between the upper limit rotational speed and the lower limit rotational speed, the control command generating section configured to drive the motor control section by the first current command signal obtained from the fixed second target torque signal of the second signal generating section in place of the third current command signal in a first stage, when the control command generating section receives the start command of the motor from the host control device when the engine stops, to output the sum signal of the first current command signal and the second current command signal to the current control section, and to drive the motor control section by the third current command signal in place of the first current command signal in a second stage, and to switch the output of the target torque switching section from the fixed second target torque signal of the second signal generating section to the first target torque signal of the first signal generating section in a third stage.

According to another aspect of the invention, a motor control method of controlling an electric oil pump in an oil pump system, the oil pump system including a mechanical oil pump arranged to be driven by an engine to supply a hydraulic pressure, an electric oil pump arranged to be driven by a sensorless motor to supply the hydraulic pressure, an oil supply switching mechanism arranged to select an oil supply from the mechanical oil pump when the engine drives, and to select the oil supply from the electric oil pump when the engine stops, and a host control device configured to generate a start signal of the motor and an information of the oil supply of the oil pump system when the engine stops, the motor control method comprises: generating a sum signal of a first current command signal to determine a torque of the motor and a second current command signal determined by a deviation in rotational speed of the motor, by using the information of the oil supply from the host control device; generating a third current command signal from a difference between the sum signal outputted from the control command generating section and a load current flowing in the motor; performing a vector control by receiving the third current command signal from the current control section; controlling an alternating current applied to the motor by being controlled by the motor control section, and to control an alternating current applied to the motor; starting the motor control section by the first current command signal to set the torque to a constant value in a first stage of the start of the motor; driving the motor control section by a current feedback signal which is set, as a target value, by the sum signal of the first current command signal to set the torque to the constant value and the second current command signal determined by the deviation in the rotational speed of the motor; and driving the motor control section by the current feedback signal which is a current command signal which is determined from target signals of the rotational speed and the torque determined from the information of the oil supply from the host control section and the target signal of the speed in a third stage.

According to still another aspect of the invention, a motor control method of controlling an electric oil pump in an oil pump system, the oil pump system including a mechanical oil pump arranged to be driven by an engine to supply a hydraulic pressure, an electric oil pump arranged to be driven by a sensorless motor to supply the hydraulic pressure, an oil supply switching mechanism arranged to select an oil supply from the mechanical oil pump when the engine drives, and to select the oil supply from the electric oil pump when the engine stops, and a host control device configured to generate a start signal of the motor and an information of the oil supply of the oil pump system when the engine stops, the motor control method comprises: generating a sum signal of a first current command signal to determine a torque of the motor and a second current command signal determined by a deviation in rotational speed of the motor, by using the information of the oil supply from the host control device; generating a third current command signal from a difference between the sum signal outputted from the control command generating section and a load current flowing in the motor; performing a vector control by receiving the third current command signal from the current control section; controlling an alternating current applied to the motor by being controlled by the motor control section, and to control an alternating current applied to the motor; starting the motor control section by the first current command signal to set the torque to a constant value by an open loop in an initial stage of the start of the motor; and switching to a closed loop control by using the speed and the current of the motor as feedback signals.

DETAILED DESCRIPTION OF THE INVENTION

Hereinafter, a motor control apparatus/method for an electric oil pump according to one embodiment of the present invention is illustrated with reference to drawings.

Figure 1:
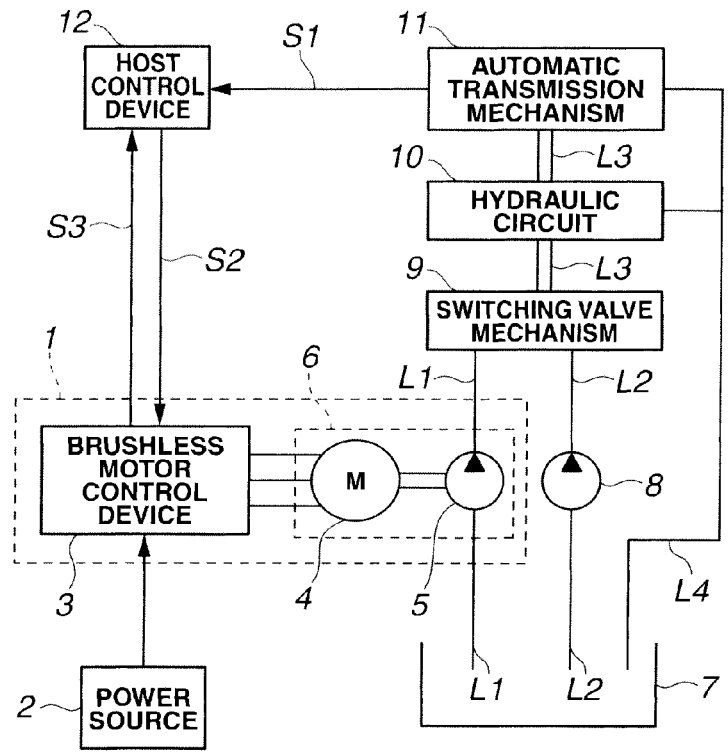
FIG. 1 is a block diagram showing an entire structure of an electric oil pump system to which a motor control apparatus for an electric oil pump according to the present invention is applicable.

FIG. 1 is a block diagram showing an entire structure of an oil pump system to which the motor control apparatus for the electric oil pump according to the one embodiment of the present invention is applied.

The oil pump system includes a mechanical oil pump 8 which is arranged to be driven by an engine, and thereby to supply a high pressure oil; an electric oil pump 5 controlled by the control apparatus according to the present invention; and hydraulic pressure passages L1, L2, L3, and L4 arranged to supply the oil stored in an oil pan 7 to a hydraulic circuit 10, an automatic transmission mechanism 11 and so on, and to return the oil to oil pan 7. In this oil pump system, mechanical oil pump 8 driven by the engine supplies the oil when the engine is driving, and electric oil pump 5 supplies the oil during the idling stop.

A switching valve mechanism 9 is arranged to switch the supply and the discharge of the hydraulic fluid to engagement mechanisms such as clutches and brakes, and to perform the pressure control. Switching valve mechanism 9 is arranged to supply the oil for the lubrication and the cooling to hydraulic circuit 10, automatic transmission mechanism 11 and so on. A hydraulic pressure which enters switching valve mechanism 9, and which is equal to or greater than a predetermined pressure is supplied through hydraulic passage L3 and hydraulic circuit 10 to automatic transmission mechanism 11. Hydraulic circuit 10 may be shared with a hydraulic circuit of automatic transmission mechanism 11.

The oil pump system is constructed as described above. The control of electric oil pump 5 in this oil pump system will be explained hereinafter.

In order to control electric oil pump 5, there is provided an electric oil pump assembly 6 including an brushless motor 4 and electric oil pump 5 driven by brushless motor 4. This oil pump system includes a host control device (unit) 12 arranged to control the driving of electric oil pump assembly 6, a brushless motor control device (unit) 3 configured to control the driving of electric oil pump assembly 6 based on a control command signal from host control device 12, and a power source 2 arranged to supply electric power to brushless motor control apparatus 3.

With this, electric oil pump 5 is driven by brushless motor 4, and brushless motor 4 is controlled by brushless motor control device 3. The control of brushless motor 4 by brushless motor control device 3 is executed by a command from host control device 12. In this case, an electric oil pump apparatus 1 includes brushless motor control device 3, brushless motor 4, and electric oil pump 5.

This electric oil pump apparatus 1 includes electric oil pump assembly 6, and brushless motor control device 3 having a microcomputer configured to control electric oil pump assembly 6. Electric oil pump apparatus 1 supplies the hydraulic pressure to the engagement mechanisms such as the clutches and the brakes by actuating electric oil pump assembly 6 when the engine stops or when necessary hydraulic pressure cannot be ensured by mechanical oil pump 8.

Moreover, host control device 12 receives a signal from a rotation sensor arranged to sense an input rotational speed of automatic transmission 11, a signal from a shift sensor arranged to sense a shift range of a shift lever by which a driver of the vehicle operates the automatic transmission, and so on. Host control device 12 outputs, to brushless motor control device 3, a control command S2 to actuate electric oil pump assembly 6, based on these signals S1. At the same time, host control device 12 outputs an oil temperature information Tc from an oil temperature sensor attached in automatic transmission mechanism 11 or hydraulic pressure circuit 10. Moreover, host control device 12 has a function to receive a rotational speed information and a failure (malfunction) information S3 from brushless motor control device 3.

Power supply 2 is a storage device such as a battery. Power supply 2 is connected to brushless motor control device 3 to supply the electric power to brushless motor control device 3.

Automatic transmission 11 is provided with the oil temperature sensor arranged to sense the oil temperature, and the rotational speed sensor arranged to sense the rotational speed. The oil temperature sensed by the oil temperature sensor and the rotational speed sensed by the rotational speed sensor are outputted, as signal S1, to host control device 12.

The operation of the oil pump system by the above-described control apparatus is illustrated below. First, when the engine drives, mechanical oil pump 8 sucks the oil stored in oil pan 7. The sucked oil passes through switching valve mechanism 9. The oil is used for supplying the hydraulic pressure to the engagement mechanism such as the clutches and the brakes, and for lubricating and cooling arbitrary portions of automatic transmission 11.

On the other hand, for example, when the engine stops during the idling stop at wait at stoplights, the rotational speed of the engine is decreased, and accordingly the rotational speed of mechanical oil pump 8 is decreased. With this, the hydraulic pressures of hydraulic passages L2 and L3 are decreased. Therefore, it is difficult to generate the hydraulic pressure.

Accordingly, during the stop of the engine, electric oil pump assembly 6 arranged to be driven by the electric power from the outside such as the battery is started so as to ensure the hydraulic pressure to the engagement mechanisms.

At the same time as the idling stop, host control device 12 configured to control the hydraulic pressure supplied to hydraulic circuit 10, automatic transmission mechanism 11 and so on generates control command S2 to start electric oil pump assembly 6, and outputs this control command S2 to brushless motor control device 3. With this, host control device 12 rotates electric oil pump assembly 6 to increase the hydraulic pressure.

The hydraulic pressure of mechanical oil pump 8 is decreased by the deceleration of mechanical oil pump 8 by the stop of the engine, and by the start and the speed increase of electric oil pump assembly 6. When the hydraulic pressure of electric oil pump assembly 6 which is prevented by switching valve mechanism 9 becomes greater than a predetermined value, the oil is circulated from hydraulic passage L1 of electric oil pump assembly 6 through switching valve mechanism 9, hydraulic pressure circuit 10, automatic transmission mechanism 11, hydraulic passage L4, and oil pan 7.

In the control apparatus and the control method according to the present invention, it is required that the control in the oil pump driving motor of the sensorless control type which does not have a magnetic pole position sensor and a rotational sensor is performed in the time period of the switching from hydraulic passage L2 to hydraulic passage L1 so that the motor is not brought into step-out in which the motor is uncontrollable.

Figure 2:
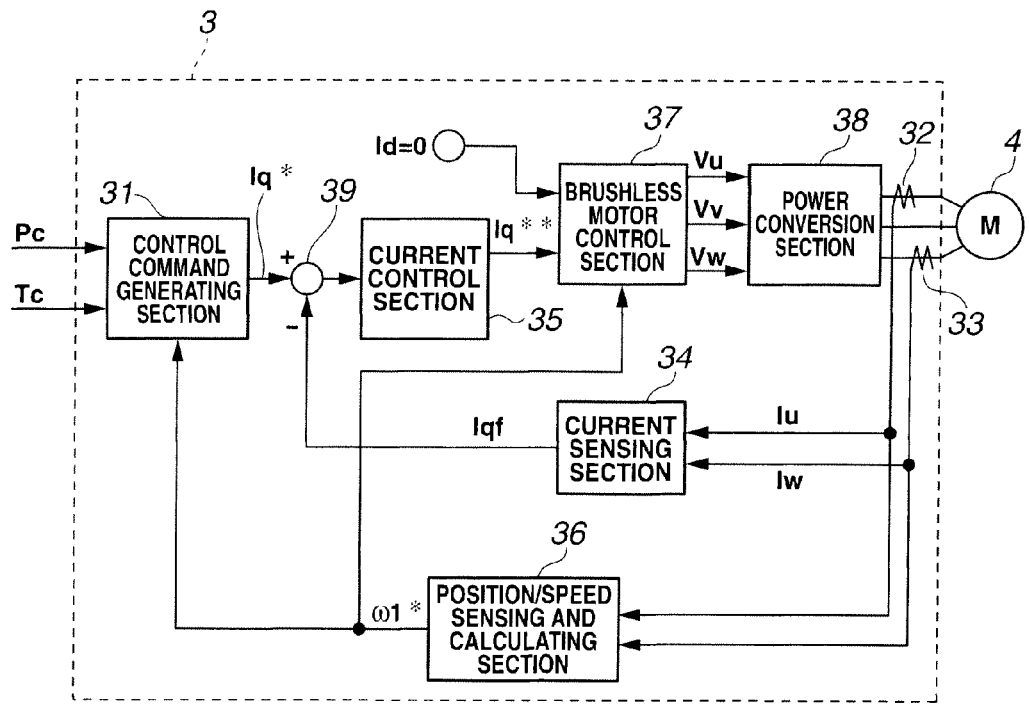
FIG. 2 is a control block diagram showing a brushless motor control device of FIG. 1.

FIG. 2 is a control block diagram showing the brushless motor control system for driving the electric oil pump according to the present invention.

In order to control brushless motor 4, brushless motor control device 3 includes a control command generating section 31 configured to generate a q-axis current command value Iq* of the brushless motor for control brushless motor 4; a current control section 35 configured to control the current; a brushless motor control section 37 configured to perform a vector operation; and an electric power conversion section 38 controlled by an output of brushless motor control section 37.

When this control operation is performed, brushless motor control device 3 performs read-in of q-axis current Iq as feedback value Iqf to current control section 35, and rotational speed $\omega 1*$ of brushless motor 4 for the vector operation in brushless motor control section 37, which are processing amounts from the side of brushless motor 4. Reference numerals 32 and 33 are current sensors arranged to sense arbitrary two phase currents Iu and Iw from three phase currents, respectively. A reference numeral 34 is a current sensing section arranged to derive q-axis current Iqf which is the feedback value. A numeral 36 is a position/speed sensing and calculating section arranged to calculate a magnetic pole position and a motor rotational speed from a brushless motor current sensed by current sensing sections 32 and 33.

Moreover, when this control operation is performed, brushless motor control device 3 receives hydraulic pressure command value Pc and oil temperature Tc which are control signals from host control device 12.

Hereinafter, operations of the sections constituting brushless motor control section 3 are illustrated. First, control command generating section 31 receives hydraulic pressure command value Pc and oil temperature Tc which are the control signals from host control device 12, converts these to a torque command value, and generates q-axis current command value Iq* of brushless motor 4. In this case, the q-axis current of the brushless motor is a torque current of the brushless motor. Control command generating section 31 determines set value Iq* of the torque current.

Figure 3:
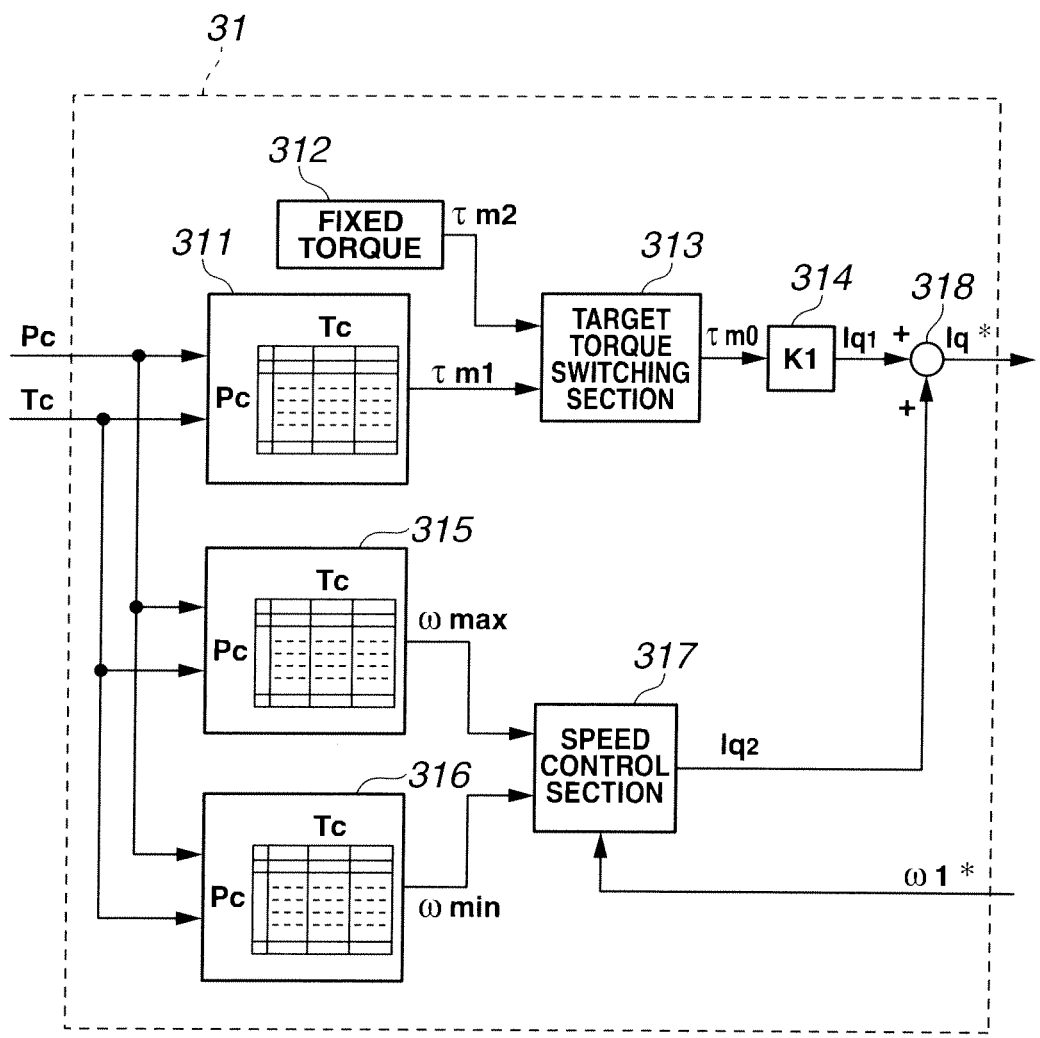
FIG. 3 is a control block diagram showing a control command generating section of FIG. 2.

When control command generating section 31 determines q-axis current command value Iq*, control command generating section 31 imports rotational speed $\omega 1*$ from position/speed sensing and calculating section 36. The apparatus and method according to this embodiment of the present invention uses a specific manner of set value Iq* of the torque current. FIG. 3 shows a circuit configuration as explained later.

Current control section 35 performs the feedback of q-axis current Iqf sensed by current sensing section 34. Subtraction circuit 39 calculates a difference Iq*−Iqf between command value Iq* and q-axis current Iqf. Current control section 35 obtains an output signal Iq** by performing a proportional-plus-integral control. In this case, current sensors 32 and 33 sense the arbitrary two phase currents Iu and Iw of the three phase currents. Current sensing section 34 derives the q-axis component from these currents.

Brushless motor control section 37 receives output signal Iq** of current control section 35, rotational speed $\omega 1*$, and d-axis current command value Id of the brushless motor 4, and performs the vector operation. Brushless motor control section 37 outputs three phase alternating voltages Vu, Vv, and Vw of U phase, V phase, and W phase to electric power conversion section 38. Electric power conversion section 38 converts to three phase alternating current, and outputs the three phase alternating current to brushless motor 4. Besides, position/speed sensing and calculating section 36 calculates the magnetic pole position and the motor rotational speed from the brushless motor current sensed by current sensors 32 and 33.

By the control device 3 of FIG. 2, current control section 35 receives and calculates a deviation value obtained by current deviation calculating section (subtraction circuit) 39 from current command value Iq* and current sensing value Iq, and outputs a second current command value Iq. Then, brushless motor control section 37 receives current command value Iq, d-axis current command value Id and rotational speed $\omega 1^*$ of the brushless motor, and performs the vector operation. Electric power conversion section 38 receives output voltages Vu, Vv and Vw of brushless motor control section 37, and coverts these to the three phase alternating current. Power conversion section 38 outputs this three phase alternating current to rotate brushless motor 4 so as to drive electric oil pump 5.

In this way, by the control configuration of FIG. 2, brushless motor 4 is controlled by q-axis current command value Iq*. This q-axis current command value Iq* is determined by control command generating section 31 shown in detail in FIG. 3. Q-axis current command value Iq* is determined by hydraulic pressure command value Pc and oil temperature Tc which are outputted, as the control signals, from host control device 12 to brushless motor control device 3.

Next, control command generating section 31 is illustrated in detail with reference to FIG. 3.

When control command generating section 31 determines q-axis current command value Iq*, an adder 318 determines a sum of an output Iq1 of a target torque switching section 313 and an output Iq2 from a speed control section (speed limiting section) 317. That is, q-axis current command value Iq* is determined in terms of the torque and the speed. Moreover, target torque switching section 313 and speed control section 317 receive hydraulic pressures command value Pc and oil temperature Tc which are the control signals from host control device 12, and determines the outputs Iq1 and Iq2.

For determining output Iq1 in terms of the torque, control command generating section 31 includes torque command generating section 311 configured to receive hydraulic pressure command value Pc and oil temperature Tc which are the control signals from host control device 12, to select a torque command value τm1 from a data table previously prepared, and to output torque command value τm1; a fixed torque generating section 312 configured to provide a fixed torque τm2; a target torque switching section 313 configured to receive torque command value τm1 and fixed torque τm2, and to determine a target torque τm0; and a constant conversion section 314 configured to convert target torque τm0 to current command value Iq1.

Moreover, for determining output Iq2 in terms of the speed, control command generating section 31 includes an upper limit section 315 configured to receive hydraulic pressure command value Pc and oil temperature Tc which are the control signals from host control device 12, to select an upper limit rotational speed ωmax from a data table previously prepared, and to output upper limit rotational speed ωmax; a lower limit section 316 configured to select a lower limit rotational speed ωmin from a data table previously prepared, and to output lower limit rotational speed ωmin; and a speed control (limiting) section 317 configured to receive actual motor rotational speed $\omega 1^*$ sensed by position/speed sensing and calculating section 36, to determine current command value correction quantity Iq2 so that the motor rotational speed is between upper limit rotational speed ωmax and lower limit rotational speed ωmin, and to output current command value correction quantity Iq2.

Next, target torque switch section 313 and speed control section 317 to determine the outputs Iq1 and Iq2 are illustrated. The limiting operation of the motor rotational speed during the torque control operation is performed in the following manner.

First, actual motor rotational speed $\omega 1^*$ and upper limit rotational speed ωmax and lower limit rotational speed ωmin which are selected by upper limit section 315 and lower limit section 316 are compared. When actual motor rotational speed $\omega 1^*$ is greater than upper limit rotational speed ωmax (upper limit rotational speed ωmax<actual motor rotational speed $\omega 1^*$), current command value correction quantity Iq2 which is the output of speed limit section 317 becomes a minus value so that actual motor rotational speed $\omega 1^*$ becomes equal to or smaller than upper limit rotational speed ωmax. Current command value Iq1 is subtracted by current command value correction quantity Iq2. Current command value correction quantity Iq2 functions so that actual motor rotational speed $\omega 1^*$ becomes equal to or smaller than upper limit rotational speed ωmax to limit the rotational speed.

Contrary, when actual motor rotational speed $\omega 1^*$ is smaller than lower limit rotational speed ωmin (lower limit rotational speed ωmin>actual motor rotational speed $\omega 1^*$), current command value correction quantity Iq2 which is the output of speed limit section 317 becomes a plus value so that actual motor rotational speed $\omega 1^*$ becomes equal to or greater than lower limit rotational speed ωmin. Consequently, current command value Iq1 is increased by current command value correction quantity Iq2. Current command value correction quantity Iq2 functions so that actual motor rotational speed $\omega 1^*$ becomes equal to or greater than lower limit rotational speed ωmin to limit the rotational speed.

On the other hand, when actual motor rotational speed $\omega 1^*$ is between upper limit rotational speed ωmax and lower limit rotational speed ωmin, output Iq2 is zero.

Besides, when speed limit section 317 determines current command value correction quantity Iq2, speed limit section 317 performs the proportional-plus-integral control with respect to the input deviation.

Accordingly, q-axis current command value Iq* generated by control command generating section 31 becomes Iq1 when motor rotational speed $\omega 1^*$ is between upper limit rotational speed ωmax and lower limit rotational speed ωmin. On the other hand, q-axis current command value Iq* becomes Iq1+Iq2 by adding current command value correction quantity Iq2 corresponding to a deviation quantity when motor rotational speed $\omega 1^*$ is deviated from a range between upper limit rotational speed ωmax and lower limit rotational speed ωmin.

Figure 4:
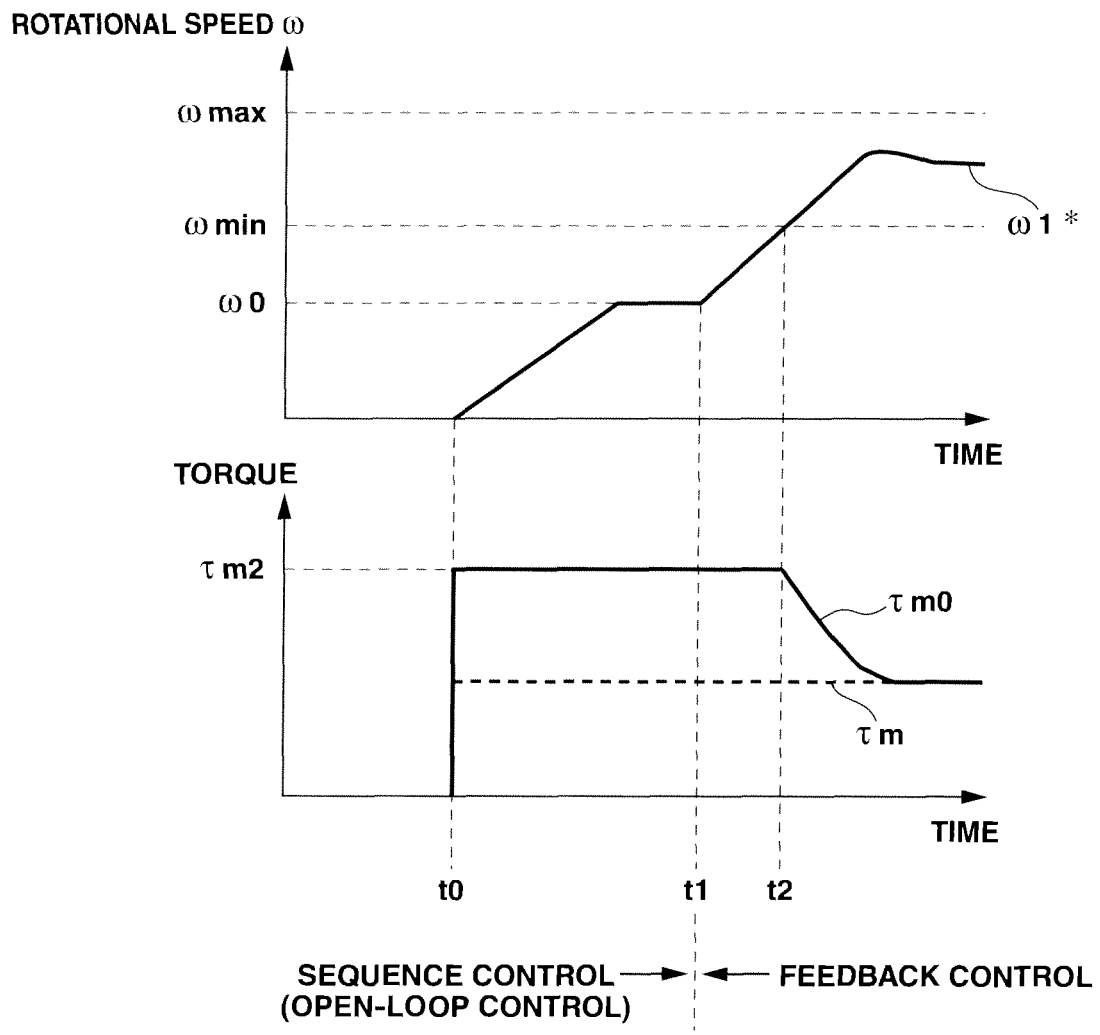
FIG. 4 is a view for illustrating an operation of a target torque switching section.

Next, the operation of target torque switching section 313 is illustrated with reference to FIG. 4. FIG. 4 shows a variation of signals after time t0 at which the engine stops and the vehicle becomes the idling stop state. In FIG. 4, a horizontal axis represents a time.

First, host control device 12 senses that the engine stops and the vehicle becomes the idling stop state. Host control device 12 outputs control command S2 to activate electric oil pump assembly 6, to brushless motor control device 3. Moreover, at this time, host control device 12 outputs, with the control signals S2, hydraulic pressure command value Pc and oil temperature Tc which are newest control signals, to brushless motor control device 3.

Torque command generating section 311 in FIG. 3 within brushless motor control device 3 which receives control command S2 generates target torque τm1 with reference to the data table from the hydraulic pressure command value Pc and oil temperature Tc which are the newest control signals provided from host control device 12, at time t0 of FIG. 4.

On the other hand, target torque switching section 313 receives fixed torque τm2 previously prepared, from fixed torque generating section 312, in addition to target torque τm1. Target torque switching section 313 selects, as output τm0, fixed torque τm2 from fixed torque generating section 312 in an initial state when the engine stops and the vehicle becomes the idling stop state, and starts the activation (start-up).

In a period in which fixed torque τm2 is selected as output τm0 for the start-up, the output of constant conversion section 314 configured to convert target torque τm0 to current command value Iq1 is not provided as the target signal of current control section 35 in FIG. 2, and provided directly to brushless motor control section 37. That is, in this period, the feedback control of the rotational speed and the current is not performed, current command value Iq1 is provided, as current command value Iq**, directly to brushless motor control section 37 to perform the open loop control.

Besides, there are some methods of the open loop control. However, in any open loop control method, brushless motor control section 37 is driven only by current command value Iq1. The output of the speed control system or the current control system which uses the feedback signal is not provided to brushless motor control section 37. There is provided a signal switching circuit (not shown) configured to attain the above-described control.

With this, it is possible to sufficiently ensure the torque necessary at the start-up of the motor. In a time period from time t0 to time t1, a start-up sequence operation by which the actual motor rotational speed increases to a predetermined rotational speed is performed.

From time t1 at which a predetermined time period elapsed after actual motor rotational speed reaches a predetermined rotational speed ω0, current control section 35 of FIG. 2 and speed control section 317 of FIG. 3 receives, as the input, actual motor rotational speed ω1* which is the output of position/speed sensing and calculating section 36 and current detection value Iqf which is the output of current sensing section 34, and performs the feedback control to drive the motor.

That is, in the example of FIG. 4, at time t1, actual motor rotational speed ω1* is smaller than lower limit rotational speed ωmin (lower limit rotational speed ωmin>actual motor rotational speed ω1*). Accordingly, current command value correction quantity Iq2 which is the output of speed control section 317 becomes the plus value so that actual motor rotational speed ω1* becomes equal to or greater than lower limit rotational speed ωmin. Accordingly, current command value correction value Iq2 on the rotational speed side is added to command value Iq1 on the torque side which is determined by fixed torque τm2, current command value Iq* of control command generating section 31 is determined by the sum of command value Iq1 and current command value correction quantity Iq2 as the target current of current control section 35. Current control section 35 operates brushless motor control section 37 on the downstream side so as to attain the provided target value.

In this way, at time t2, it is confirmed that actual motor rotational speed ω1* is in the desired activation region between upper limit rotational speed ωmax and lower limit rotational speed ωmin. Target torque switch section 313 selects, as target torque τm(0), torque command value τm1 determined from the data table, in place of fixed torque τm2.

Besides, torque command value τm1 is selected as target torque τm0, in place of fixed torque τm2, and provided as the set signal to the downstream current control section 35. From this time, brushless motor control section 37 receives, as the input, second current command value Iq which is the output of current control section 35. Accordingly, before and after this time, brushless motor control section 37 suddenly varies from current command value Iq1 to second current command value Iq which is the output of current control section 35. Therefore, a bumpless control is performed to suppress the sudden variation.

Moreover, in the example of FIG. 4, the switching of the control system is performed when the motor rotational speed reaches the predetermined speed. However, this switching may be performed by a time period from the start-up.

As mentioned above, target torque switching section 313 switches target torque τm0. With this, in the brushless motor system for driving the electric oil pump, it is possible to select the necessary torque in the operation scene such as the start-up of the motor. Accordingly, the control apparatus and the control method according to the embodiment of the present invention can stably control without suffering the step-out by the sudden load variation at the start-up of the motor.

Moreover, it is possible to decrease the generation of the impact torque and the generation of the abnormal sound, and to decrease the damage of the motor and the pump.

The entire contents of Japanese Patent Application No. 2010-205150 filed Sep. 14, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A motor control apparatus for an electric oil pump in an oil pump system, the oil pump system including a mechanical oil pump arranged to be driven by an engine to supply a hydraulic pressure, the electric oil pump arranged to be driven by a sensorless motor to supply the hydraulic pressure, an oil supply switching mechanism arranged to select an oil supply from the mechanical oil pump when the engine drives, and to select the oil supply from the electric oil pump when the engine stops, and a host control device configured to generate a start signal of the motor and provide information about the oil supply of the oil pump system when the engine stops, the motor control apparatus comprising:
a control command generating section configured to generate a sum signal by using a first current command signal to determine a torque of the motor, a second current command signal determined by a rotational speed of the motor, and the information about the oil supply from the host control device;
a current control section configured to generate a third current command signal from a difference between the sum signal outputted from the control command generating section and a load current flowing in the motor;
a motor control section configured to receive the third current command signal from the current control section, and to perform a vector control;
an electric power conversion section configured to be controlled by the motor control section, and to control an alternating current applied to the motor;
wherein the control command generating section includes:
a first signal generating section configured to generate a first target torque signal based on the information about the oil supply from the host control device,
a second signal generating section configured to generate a fixed second target torque signal, a target torque switching section configured to set one of the first target torque signal and the fixed second target torque signal from the first signal generating section and the second signal generating section, to the first current command signal, a third signal generating section configured to set an upper limit rotational speed of the motor based on the information about the oil supply from the host control device, a fourth signal generating section configured to set a lower limit rotational speed of the motor based on the information about the oil supply from the host control device, a speed control section configured to sense the rotational speed of the motor, and to set the second current command signal to control the rotational speed of the motor between the upper limit rotational speed and the lower limit rotational speed, wherein the control command generating section is configured to:

drive the motor control section by the first current command signal obtained from the fixed second target torque signal of the second signal generating section in place of the third current command signal in a first stage, when the control command generating section receives a start command of the motor from the host control device when the engine stops, output the sum signal to the current control section, and drive the motor control section by the third current command signal in place of the first current command signal in a second stage, and switch output of the target torque switching section from the fixed second target torque signal of the second signal generating section to the first target torque signal of the first signal generating section in a third stage.

2. The motor control apparatus as claimed in claim 1, wherein the information about the oil supply from the host control device is a hydraulic pressure and an oil temperature.

3. The motor control apparatus as claimed in claim 1, wherein switching to the second stage and the third stage is performed when the rotational speed of the motor reaches a predetermined speed.

4. The motor control apparatus as claimed in claim 1, wherein switching to the second stage and the third stage is performed in accordance with a time period from start of the motor.

5. A motor control method of controlling an electric oil pump in an oil pump system, the oil pump system including a mechanical oil pump arranged to be driven by an engine to supply a hydraulic pressure, the electric oil pump arranged to be driven by a sensorless motor to supply the hydraulic pressure, an oil supply switching mechanism arranged to select an oil supply from the mechanical oil pump when the engine drives, and to select the oil supply from the electric oil pump when the engine stops, and a host control device configured to generate a start signal of the motor and provide information about the oil supply of the oil pump system when the engine stops, the motor control method comprising:

a control command generating section generating a sum signal by using a first current command signal to determine a torque of the motor, a second current command signal determined by a rotational speed of the motor, and the information about the oil supply from the host control device;

a current control section generating a third current command signal from a difference between the sum signal outputted from the control command generating section and a load current flowing in the motor;

performing a vector control by receiving the third current command signal from the current control section;

a motor control section controlling an alternating current applied to the motor;

starting the motor control section using the first current command signal to set the torque to a constant value in a first stage during startup of the motor;

driving the motor control section by a current feedback signal which is set, as a target value, by the sum signal in a second stage; and driving the motor control section by a current feedback signal which is a current command signal determined from a target signal of the rotational speed, the determined torque, and the information about the oil supply from the host control section in a third stage.

6. A motor control method for controlling an electric oil pump in an oil pump system, the oil pump system including a mechanical oil pump arranged to be driven by an engine to supply a hydraulic pressure, the electric oil pump arranged to be driven by a sensorless motor to supply the hydraulic pressure, an oil supply switching mechanism arranged to select an oil supply from the mechanical oil pump when the engine drives, and to select the oil supply from the electric oil pump when the engine stops, and a host control device configured to generate a start signal of the motor and provide information about the oil supply of the oil pump system when the engine stops, the motor control method comprising:

generating a sum signal by using a first current command signal used to determine a torque of the motor, a second current command signal determined by a rotational speed of the motor, and the information about the oil supply from the host control device;

generating a third current command signal from a difference between the sum signal and a load current flowing in the motor;

performing a vector control using the third current command signal to control an alternating current applied to the motor;

starting the motor using the first current command signal to set the torque to a constant value by an open loop control in an initial stage of the start of the motor; and switching to a closed loop control by using the rotational speed and the current of the motor as feedback signals.

* * * * *